(12) United States Patent
Grigoriev et al.

(10) Patent No.: US 8,066,847 B2
(45) Date of Patent: Nov. 29, 2011

(54) CREPING ADHESIVES COMPRISING BLENDS OF POLYAMINOAMIDE EPIHALOLHYDRIN RESINS AND POLYAMIDES

(75) Inventors: Vladimir A. Grigoriev, Chicago, IL (US); Gary S. Furman, St. Charles, IL (US); Sammy Lee Archer, Lynnwood, WA (US); Winston Su, Naperville, IL (US); Christopher D. Kaley, Aurora, IL (US); Mingli Wei, Naperville, IL (US)

(73) Assignee: Nalco Corporation, Naperville, IL (US)

( * ) Notice: Subject to any disclaimer, the term of this patent is extended or adjusted under 35 U.S.C. 154(b) by 643 days.

(21) Appl. No.: 11/321,995

(22) Filed: Dec. 29, 2005

(65) Prior Publication Data

US 2007/0151684 A1    Jul. 5, 2007

(51) Int. Cl.
   *C08G 69/48* (2006.01)
   *C08L 77/06* (2006.01)

(52) U.S. Cl. ............... 162/111; 162/112; 162/164.3; 162/164.6; 162/168.3; 162/179; 525/408; 525/430; 524/514; 524/845

(58) Field of Classification Search .......... 162/111–112, 162/158, 164.1, 164.3, 164.6, 168.1–168.3, 162/179; 525/420, 430; 528/271, 310, 332, 528/480; 524/599, 606–608, 612, 514, 845
See application file for complete search history.

(56) References Cited

U.S. PATENT DOCUMENTS

| | | | | |
|---|---|---|---|---|
| 2,926,154 A | * | 2/1960 | Keim | 524/607 |
| 3,125,552 A | * | 3/1964 | Loshaek et al. | 525/421 |
| 3,332,901 A | * | 7/1967 | Keim | 524/608 |
| 3,615,551 A | * | 10/1971 | Farnley | 430/531 |
| 3,700,623 A | * | 10/1972 | Keim | 525/328.3 |
| 3,772,076 A | * | 11/1973 | Keim | 162/164.3 |
| 3,887,510 A | * | 6/1975 | Chan et al. | 524/602 |
| 3,932,363 A | * | 1/1976 | Lehmann et al. | 525/421 |
| 3,951,921 A | * | 4/1976 | Espy et al. | 525/430 |
| 4,127,418 A | * | 11/1978 | Bateman et al. | 106/215.3 |
| 4,166,002 A | * | 8/1979 | Lehmann et al. | 162/164.5 |
| 4,181,567 A | * | 1/1980 | Riddell et al. | 162/168.3 |
| 4,341,670 A | * | 7/1982 | Hinze et al. | 528/338 |
| 4,501,862 A | * | 2/1985 | Keim | 525/430 |
| 4,537,657 A | * | 8/1985 | Keim | 162/164.3 |
| 4,994,146 A | * | 2/1991 | Soerens | 162/112 |
| 5,316,623 A | * | 5/1994 | Espy | 162/164.3 |
| 5,338,428 A | * | 8/1994 | Zewert et al. | 204/469 |
| 5,490,904 A | * | 2/1996 | Jansma et al. | 162/168.2 |
| 5,525,664 A | * | 6/1996 | Miller et al. | 524/845 |
| 5,667,637 A | * | 9/1997 | Jewell et al. | 162/146 |
| 5,865,950 A | * | 2/1999 | Vinson et al. | 162/112 |
| 6,133,405 A | * | 10/2000 | Allen | 528/310 |
| 6,162,327 A | * | 12/2000 | Batra et al. | 162/109 |
| 6,187,137 B1 | * | 2/2001 | Druecke et al. | 162/109 |
| 6,193,838 B1 | * | 2/2001 | Oriaran et al. | 162/112 |
| 6,277,242 B1 | | 8/2001 | Archer et al. | |
| 6,429,181 B2 | * | 8/2002 | Sweeny et al. | 510/382 |
| 6,429,253 B1 | * | 8/2002 | Guerro et al. | 524/514 |
| 6,440,267 B1 | * | 8/2002 | Rekoske et al. | 162/111 |
| 6,506,716 B1 | * | 1/2003 | Delplancke et al. | 510/336 |
| 6,706,144 B1 | * | 3/2004 | Furman et al. | 162/72 |
| 7,081,512 B2 | * | 7/2006 | Riehle | 528/480 |
| 7,291,695 B2 | * | 11/2007 | Wei et al. | 528/480 |
| 2004/0177940 A1 | * | 9/2004 | Archer et al. | 162/199 |
| 2005/0006040 A1 | * | 1/2005 | Boettcher et al. | 162/111 |
| 2005/0006042 A1 | * | 1/2005 | Riehle et al. | 162/164.3 |
| 2005/0015888 A1 | * | 1/2005 | Altmann et al. | 8/115.51 |
| 2005/0133177 A1 | * | 6/2005 | Stralin et al. | 162/115 |
| 2005/0279471 A1 | * | 12/2005 | Murray et al. | 162/111 |
| 2007/0000631 A1 | * | 1/2007 | Grigoriev et al. | 162/111 |
| 2007/0151684 A1 | * | 7/2007 | Grigoriev et al. | 162/111 |
| 2008/0255320 A1 | * | 10/2008 | Allen | 525/430 |
| 2009/0133846 A1 | * | 5/2009 | Grigoriev et al. | 162/112 |
| 2010/0122785 A1 | * | 5/2010 | Grigoriev et al. | 162/111 |

FOREIGN PATENT DOCUMENTS

| WO | WO 9902486 A1 | * | 1/1999 |
| WO | WO 9953140 A1 | * | 10/1999 |
| WO | WO 2005098130 A2 | * | 10/2005 |
| WO | WO 2007079064 A2 | * | 7/2007 |

* cited by examiner

*Primary Examiner* — Jose A Fortuna
(74) *Attorney, Agent, or Firm* — Benjamin E. Carlsen; Michael B. Martin

(57) ABSTRACT

A composition comprising one or more polyaminoaminde epihalohydrin resins and one or more polyamides in a ratio of about 1:99 to about 99:1 based on polymer actives and use of the composition for creping paper webs.

23 Claims, No Drawings

CREPING ADHESIVES COMPRISING BLENDS OF POLYAMINOAMIDE EPIHALOHYDRIN RESINS AND POLYAMIDES

TECHNICAL FIELD

This invention relates to a method of creping paper products in which a paper web is adhered to a creping cylinder using an adhesive composition comprising a blend of polyaminoamide epichlorohydrin resin and polyamide.

BACKGROUND OF THE INVENTION

The desired properties of tissue, including softness, bulk, stretch and absorbency, are achieved by the means of a steam-heated Yankee dryer cylinder and a doctor blade. The wet fiber web is largely dewatered at the pressure roll nip where the sheet is transferred to the Yankee surface. At this point the paper web has 35-40% consistency. The sheet is further dried on the hot Yankee cylinder to 90-97% consistency and removed with a doctor blade. The mechanical action of the blade results in a disruption of the fiber-fiber bonds and a formation of a microfold structure within the sheet. This process is referred to as creping.

In order to develop the crepe, the paper web has to adhere to the surface of the Yankee dryer. The adhesion is provided by spraying an adhesive on the dryer. Most common Yankee adhesives are synthetic polymers such as polyaminoamide-epichlorohydrin resins, polyamine-epichlorohydrin resins, polyvinyl alcohols, polyvinyl acetates, polyacrylamides and polyethers. Various low molecular weight compounds, oils and surfactants, are used to modify the Yankee coating properties.

A creping adhesive comprising a mixture of high molecular weight and low molecular weight polyaminoamide epihalohydrin resins, PAE-I and PAE-II, respectively, is described in U.S. Pat. No. 6,277,242.

The tissue industry is interested in manufacturing very soft tissue (premium grades) that requires creping at very low sheet moisture levels (<3%). The conventional creping adhesives tend to become hard and less rewettable upon the extensive drying that is required for low moisture creping. The hard coating results in blade chatter and loss of adhesion, which can result in blade wear and non-uniform creping. Thus, there is a great demand for a creping adhesive that remains soft and rewettable under low moisture creping conditions.

Traditional thermosetting adhesives, very similar to permanent wet strength resins, form very brittle coatings and work better at high moisture (>6%) creping conditions. Some thermosetting adhesives with lower levels of cross-linking are much more universal and can be used for creping over a wider range of sheet moisture, 3-7%. Non-thermosetting resins are generally easier to manage and provide better sheet control when creping at lower moisture levels. Modifiers, e.g. polyols such as glycerol, can further be used to adjust the level of adhesion and to improve softness and rewettability of the coating. However, even with the addition of modifiers, conventional adhesives become too hard and their use is still limited to moisture levels of >3%. Accordingly, there is an ongoing need for improved creping adhesive compositions.

SUMMARY OF THE INVENTION

In an embodiment, this invention is a composition comprising one or more polyaminoamide epihalohydrin resins and one or more polyamides in a ratio of about 1:99 to about 99:1 based on polymer actives.

In another embodiment, this invention is a method of creping a paper web comprising a) applying to a rotating creping cylinder an adhesive composition comprising one or more polyaminoamide epihalohydrin resins and one or more polyamides in a ratio of about 1:99 to about 99:1 based on polymer actives; b) pressing the paper web against the creping cylinder to effect adhesion of the paper web to the creping cylinder; and c) dislodging the paper web from the creping cylinder with a doctor blade.

DETAILED DESCRIPTION OF THE INVENTION

Polyamides useful in the composition of this invention may be made from the condensation polymerization of one or more organic dicarboxylic acid derivatives and one or more polyalkylene polyamines under conditions suitable for forming long-chain polyamides, for example at temperatures higher than about 130° C. for several hours with removal of water or alcohol byproducts. The resulting polyamide typically has weight average molecular weight of about 500 to about 500,000 Daltons as determined by gel permeation chromatography/multi-angle light scattering (GPC/MALLS) and a polymer Brookfield viscosity higher than about 100 cps for a 50% solution at 25° C. Water may be added at the end of the polymerization to make an aqueous polymer solution.

Generally, a sufficient amount of organic acid derivative to react with substantially all of the primary amino groups but insufficient to react to any significant degree with the secondary amino groups of the polyalkylene polyamine is used. In an embodiment, the organic dicarboxylic acid derivative and polyalkylene polyamine are reacted in a molar ratio of about 0.8:1 to about 1.4:1. In another embodiment, the organic dicarboxylic acid derivative and the polyalkylene polyamine are reacted in a molar ratio of about 0.9:1 to about 1.0:0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyamide is water soluble or water dispersible.

Representative organic dicarboxylic acids and their derivatives include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl) ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

"Polyalkylene polyamines" means those organic compounds having two primary amine ($-NH_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like.

Polyaminoamide-epichlorohydrin resins useful in the composition of this invention are water soluble, cationic thermosetting resins typically prepared by reacting one or more polyalkylene polyamines containing secondary amine groups and one or more dicarboxylic acid derivatives to form a polyaminoamide and then reacting the polyaminoamide with epichlorohydrin to form the polyaminoamide-epichlorohydrin resin.

Preparation of the polyaminoamide is as described above for the preparation of the polyamide component of the composition. In an embodiment, the organic dicarboxylic acid derivative and polyalkylene polyamine are reacted in a molar ratio of about 0.8:1 to about 1.4:1. In another embodiment, the organic dicarboxylic acid derivative and the polyalkylene polyamine are reacted in a molar ratio of about 0.9:1 to about 1.0:0.9.

The polyaminoamide is then reacted with epichlorohydrin under controlled conditions to form the polyaminoamide-epichlorohydrin (PAE) resin. Preferably, the polyaminoamide is diluted with water to a concentration of about 10 to about 50 weight percent, and the solution is cooled below about 25° C. An amount of epichlorohydrin sufficient to react with the desired amount of the secondary amino groups in the polyaminoamide is then slowly added in the solution. The mixture is then heated at a temperature of about 40° C. to about 100° C. until desired viscosity is reached, typically about 2 to about 8 hours. The preparation of suitable polyaminoamide-epichlorohydrin resins is described in Patent No. 6,277,242, incorporated herein by reference.

In an embodiment, the polyaminoamide is reacted with about 0.01 to about 1.8 molar equivalents of epihalohydrin, based on secondary amino groups of the polyaminoamide.

In an embodiment, the polyaminoamide epihalohydrin resins have a weight-average molecular weight of about 10,000 to about 5,000,000 Daltons and the polyamides have a weight-average molecular weight of about 500 to about 500,000 Daltons.

In an embodiment, the epihalohydrin is epichlorohydrin.

In an embodiment, the composition of this invention comprises one or more polyaminoamide epihalohydrin resins and one or more polyamides in a ratio of about 10:90 to about 95:5 based on polymer actives. In another embodiment, the composition comprises one or more polyaminoamide epihalohydrin resins and one or more polyamides in a ratio of about 40:60 to about 80:20 based on polymer actives.

In an embodiment, the polyaminoaminde epihalohydrin resins have a weight-average molecular weight of about 50,000 to about 2,000,000 Daltons and the polyamides have a weight-average molecular weight of 500 to about 500,000 Daltons.

In an embodiment, the polyaminoamide epihalohydrin resins are prepared by reacting the polyaminoamide with about 0.05 to about 0.8 molar equivalents of epichlorohydrin, based on secondary amino groups of the polyaminoamide. In another embodiment, the polyaminoamide epihalohydrin resins are prepared by reacting the polyaminoamide with about 0.1 to about 0.3 molar equivalents of epichlorohydrin, based on secondary amino groups of the polyaminoamide.

In an embodiment, the polyaminoamide is the reaction product of diethylenetriamine and a dicarboxylic acid derivative selected from adipic acid, glutaric acid, DBE-2 dibasic ester, dimethyl glutarate and dimethyl adipate or a mixture thereof.

In an embodiment, the polyamide is the reaction product of diethylenetriamine and one or more dicarboxylic acid derivative selected from DBE-2 dibasic ester, adipic acid, glutaric acid, dimethyl glutarate and dimethyl adipate or a mixture thereof.

In an embodiment, the polyaminoamide epihalohydrin resins have a weight-average molecular weight of about 50,000 to about 2,000,000 Daltons and the polyamide has a weight-average molecular weight of about 1,000 to about 50,000 Daltons.

In an embodiment, the polyaminoamide epihalohydrin resins have a weight-average molecular weight of about 100,000 to about 1,000,000 Daltons and the polyamide has a weight-average molecular weight of about 3,000 to about 20,000 Daltons.

In an embodiment, the polyaminoamide epihalohydrin resin is a terpolymer of glutaric acid, diethylenetriamine and epichlorohydrin and the polyamide is a copolymer of adipic acid and diethylenetriamine.

The composition of this invention may be applied to the surface of a creping cylinder as a dilute aqueous solution. In an embodiment, the aqueous solution comprises about 0.01 to about 50 percent by weight of the polyaminoamide epihalohydrin resin/polyamide composition and about 99.99 to about 50 weight percent water. Those skilled in the art of creping adhesives will appreciate that the reason for such a larger percentage of water in the admixture is in part based on the need to only deposit a very thin layer of adhesive on the creping cylinder, which, in one embodiment, is most easily accomplished with a spray boom.

The pH of the aqueous solution may be adjusted in order to further stabilize the composition. In an embodiment, the pH is adjusted to about 2-7. In another embodiment, the pH is adjusted to about 4-6. The pH adjustment may be accomplished using any organic or inorganic acid. Representative acids include formic, acetic, sulfuric, hydrochloric, phosphoric, and the like. In an embodiment, the pH is adjusted using sulfuric or phosphoric acid or a mixture thereof.

In an embodiment, the adhesive composition of this invention further comprises one or more polyols, one or more phosphate salts or a mixture thereof.

As used herein, "polyols" refers to simple water-soluble polyols composed of alkylene groups and up to about six hydroxyl groups in which the alkylene groups are optionally interrupted by one or more O or NH groups. Representative polyols include glycerol, ethylene glycol, 1,4-butanediol, diethanolamine, triethanolamine, sorbitol, diethylene glycol, triethylene glycol, .propylene glycol, dipropylene glycol, polyethylene glycol, and the like.

In an embodiment, the polyols are selected from glycerol, ethylene glycol, sorbitol, diethylene glycol, propylene glycol, polyethylene glycol and diethanolamine.

In an embodiment, the polyol is glycerol.

Representative phosphate salts include the sodium, potassium and ammonium salts of orthophosphate, pyrophosphate, metaphosphate, polyphosphate, phosphite and hypophosphite. Phosphate salts also include phosphate salts formed in-situ by adjustment of the pH of the creping composition with phosphoric acid. In an embodiment the phosphate salts are selected from monoammonium phosphate, diammonium phosphate, phosphate salts formed in situ by adjusting the pH of the creping composition with phosphoric acid, and mixtures thereof.

The amount of polyols and/or phosphate salts in relation to the polyaminoamide epichlorohydrin resin/polyamide composition on a dry polymer basis typically ranges from about 0.5 to about 50 percent by weight. In an embodiment it is desirable to use between about 0.5 to about 20 percent by weight of the polyols and/or phosphate salts. It is to be understood that not all of the polyols produce similar results. In certain instances, depending upon the temperature employed, the particular polyaminoamide epichlorohydrin resin/polyamide composition used and other variables, routine experimentation will be necessary to determine the optimum polyol or phosphate salts to be used, as well as the particular amount to be employed in conjunction with the particular polyaminoamide epichlorohydrin resin/polyamide composition.

In an embodiment, a release aid that is also diluted, emulsified or dispersed to aqueous form is applied to the Yankee dryer along with the polymer adhesive. The release aid interacts with the adhesive materials on the Yankee dryer surface to avoid excessive coating build-up, to manage the sheet adhesion and to reduce doctor blade wear. Representative release aids include release oils composed of naphthenic, paraffinic, vegetable, mineral or synthetic oil and emulsifying surfactants. In order to form stable aqueous dispersions the release aid is typically formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

The adhesive compositions of this invention may also be used in combination with functional additives used in the art to improve the softness of the tissue or towel. Representative functional additives include organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like. In an embodiment, the functional additives are selected from dialkylimidazolinium quaternary salts and quaternary silicones.

In an embodiment, the functional additives are formulated with the adhesive composition of this invention for application to the creping cylinder.

The spraying applications described above may be further improved by a variety of means, for example by using spraybooms designed for double or triple coverage, by oscillating the sprayboom and by recirculation of the diluted creping aid composition from the outlet of the sprayboom to improve mixing and reduce the possibility of separation. Targeted application of the polyaminoamide epichlorohydrin resin/polyamide composition may also be accomplished using the method and apparatus described in PCT 2004031475.

Alternatively, the polyaminoamide epichlorohydrin resin/polyamide composition, functional additives and/or release aid may be applied to the creping cylinder by use of air (or gas) atomization, rather than as aqueous solutions.

The foregoing may be better understood by reference to the following examples, which are presented for purposes of illustration and are not intended to limit the scope of the invention.

EXAMPLE 1

Preparation of Adipic Acid-Diethylenetriamine Polymer.

To a 1000-ml reaction flask is charged 204.3 g of diethylenetriamine. The reactor is purged with nitrogen and 50 g of water, 4.0 g of sulfuric acid and 295.2 g of adipic acid are charged into the reactor while the mixture is heated to 165° C. Water is collected through a condenser. The reaction mixture is maintained at 165° C. for 5 hours. Optional vacuum is applied to increase polymer molecular weight. Water (423.5 g) is then slowly added into the reactor with stirring to provide a 50% polyaminoamide polymer solution.

EXAMPLE 2

Preparation of Adipic Acid-Diethylenetriamine-Epichlorohydrin Resin.

To a 500-ml reactor is charged 114 g polyamide (50% solution, prepared as in Example 1) and 283 g water. The solution is purged with nitrogen. The mixture is heated to 50° C. and 3.0 g epichlorohydrin is added into the reactor. The temperature is maintained at 50° C. and the product viscosity is monitored every 30 minutes. The reaction is stopped when the product viscosity reaches 30 cps (25° C., spindle#2 at 30rpm) by adding 16.3 g of 15% sulfuric acid. The final pH is adjusted to 3.5 with sulfuric acid.

EXAMPLE 3

Preparation of an Aqueous Polyaminoamide Epichlorohydrin Resin/Polyamide Composition.

To a 1500-ml beaker is charged polyaminoamide epichlorohydrin resin (349.75 g), prepared as in Example 2, polyaminoamide (147.97 g), prepared as in Example 1 and glycerol (27.98 g). The mixture is mixed until homogeneous and the pH is adjusted to 4.0 with 85% phosphoric acid.

EXAMPLE 4

Peel-Force Adhesion.

The adhesion provided by the formulations of this invention is measured by means of a peel adhesion test. This test measures the force required to peel a cotton strip from a heated metal plate. First, the adhesive composition, at 15% actives, is applied to the metal panel by means of a #40 coating rod. The metal plate is heated to 100° C. and at this point a wet (for wet tack) or dry (for dry tack) cotton strip is pressed into the film by means of a 1.9 kg cylindrical roller. After the strip is applied, the metal plate is placed in a 105° C. oven for 15 minutes to dry the strip. The metal plate is then clamped in a tensile testing apparatus. One end of the cotton cloth is clamped in the pneumatic grip of the tester and the cloth is peeled from the panel at an angle of 180° and at a constant speed. During the peeling the metal plate is controlled to a temperature of 100° C. A comparison of the peel force adhesion for a representative polyaminoamide epichlorohydrin resin/polyamide composition and a representative composition as described in U.S. Pat. No. 6,277,242 is shown in Table 1. In Table 1 PAE refers to polyaminoamide epichlorohydrin resin and PA refers to polyamide.

TABLE 1

Peel Force Adhesion Data

| PAE-I fraction in the blend (wt % of total polymer actives) | PAE-I + PA (this invention) | PAE-I + PAE-II (representative of U.S. Pat. No. 6,277,242) |
|---|---|---|
| 12.5 | — | 182 |
| 18.8 | — | 409 |
| 25.0 | 658 | 504 |
| 31.3 | 784 | 386 |
| 37.5 | 877 | 355 |
| 43.8 | 563 | — |

TABLE 1-continued

Peel Force Adhesion Data

| PAE-I fraction in the blend (wt % of total polymer actives) | PAE-I + PA (this invention) | PAE-I + PAE-II (representative of U.S. Pat. No. 6,277,242) |
|---|---|---|
| 50.0 | 368 | — |

As shown in Table 1, the composition of this invention, a blend a PAE resin with polyamide (PAE-I+PA), shows higher peel adhesion than the composition of U.S. Pat. No. 6,277,242, where two PAE resins (PAE-l+PAE-II) are used.

EXAMPLE 5

Glass Transition Temperature ($T_g$).

A TA 2920 differential scanning calorimeter DSC (TA Instruments, New Castle, DE) is used to measure the glass transition temperature of representative polymer compositions. Polymer samples are prepared by casting films at 105° C. The DSC instrument is calibrated with an indium standard. The sample size for DSC analysis is about 10-15 mg. The sample is heated at a heating rate of 10° C./min. The glass transition temperature of polymer is determined from the second scan using a half-height method.

EXAMPLE 6

Shear Storage Modulus (G').

The shear storage modulus is determined using a rheometer AR2000 (TA Instruments, New Castle, Del.). Samples are prepared by casting a film from a 5% (w/w) polymer solution. The samples are dried in an oven at 95° C. overnight. The resulting film is punched with a die (8 mm in diameter) to make a sample disc. The disks are dried in vacuum oven at 110° C. for two hours and stored in a desiccator before use. The geometry used for the analysis is 8-mm stainless steel parallel plates. The shear storage modulus is determined at 110° C., 1 Hz and 0.1% strain in oscillation mode. The peel force data, glass transition temperature data and shear storage modulus data for representative adhesive compositions is shown in Table 2.

The properties and the peel-force adhesion data for a representative composition of this invention are compared with the commercial PAE adhesives, PAE-I and PAE-III. The adhesive of this invention provides a peel-force significantly higher compared to the PAE resins used in conventional creping adhesives. The glass transition temperature ($T_g$) of the adhesive of this invention is also significantly lower than that of the conventional resins. The shear storage modulus (G') data that can be closely related to the softness of the adhesive films demonstrate that the adhesive of this invention is much softer under very dry conditions compared with the conventional PAE resins.

Addition of glycerol further improves adhesion and dramatically lowers both the $T_g$ and the G' and, at the same level of glycerol (3%, product based), the adhesive of this invention still provides much higher adhesion and a significantly lower G'.

Changes can be made in the composition, operation, and arrangement of the method of the invention described herein without departing from the concept and scope of the invention as defined in the claims.

The invention claimed is:

1. A composition comprising a homogeneous mixture of one or more polyaminoamide epihalohydrin resins and one or more epihalohydrin-free polyamides formed by a chemical reaction which causes a condensation polymerization of one or more organic dicarboxylic acid derivatives and one or more polyalkene polyamines in a ratio of about 1:99 to about 99:1 based on polymer actives but in which the organic dicarboxylic acid does not react to any significant degree with the secondary amino groups of the polyalkene polyamines such that there are substantially no tertiary amines within the epihalohydrin-free polyamides.

2. The composition of claim 1 wherein the polyaminoamide epihalohydrin resins are prepared by reacting a polyaminoamide prepared by reacting one or more aliphatic or aromatic dicarboxylic acid derivatives with one or more polyalkylene polyamines in a mole ratio of about 0.8:1 to about 1.4:1 with about 0.01 to about 1.8 molar equivalents of epihalohydrin, based on secondary amino groups of the polyaminoamide and the polyamide is prepared by reacting one or more aliphatic or aromatic dicarboxylic acid derivatives with one or more polyalkylene polyamines in a mole ratio of about 0.8:1 to about 1.4:1.

3. The composition of claim 2 wherein the polyaminoamide epihalohydrin resins have a weight-average molecular weight of about 10,000 to about 5,000,000 Daltons and the polyamides have a weight-average molecular weight of about 500 to about 500,000 Daltons.

TABLE 2

Characterization and peel-force data for the Yankee adhesives.

| | | | | Peel-force (g/in) | | | G' at 110° C. |
|---|---|---|---|---|---|---|---|
| Sample | % Polymer actives | % Glycerol (product based) | pH | Wet tack | Dry tack | $T_g$ (° C.) | & 1 Hz (kPa) |
| PAE-I + PA (this invention) | 15.0 | 0 | 7 | 877 | 0 | 63 | 710 |
| PAE-I + PA modified with glycerol | 15.0 | 3 | 7 | 1053 | 188 | 33 | 32 |
| PAE-I | 15.0 | 0 | 7 | 117 | 0 | 91 | 3700 |
| PAE-I modified with glycerol | 15.0 | 3 | 7 | 102 | 113 | 30 | 230 |
| PAE-III | 14.9 | 0 | 7 | 480 | 0 | 76 | 1300 |
| PAE-III modified with glycerol | 14.9 | 3 | 7 | 57 | 62 | 26 | 46 |

PA: polyamide.
PAE-I: a polyaminoamide-epichlorohydrin resin with an epi/amine molar ratio of ~0.15.
PAE-III: a polyaminoamide-epichlorohydrin resin with an epi/amine molar ratio of ~0.10.

4. The composition of claim 3 wherein the epihalohydrin is epichlorohydrin.

5. The composition of claim 4 wherein the polyaminoamide epihalohydrin resins have a weight-average molecular weight of about 50,000 to about 2,000,000 Daltons and the polyamides have a weight-average molecular weight of 500 to about 500,000 Daltons.

6. The composition of claim 5 wherein the polyaminoamide epihalohydrin resins are prepared by reacting the polyaminoamide with about 0.05 to about 0.8 molar equivalents of epichlorohydrin, based on secondary amino groups of the polyaminoamide.

7. The composition of claim 6 wherein the polyaminoamide is the reaction product of diethylenetriamine and a dicarboxylic acid derivative selected from adipic acid, glutaric acid, DBE-2 dibasic ester, dimethyl glutarate and dimethyl adipate or a mixture thereof.

8. The composition of claim 7 wherein the polyamide is the reaction product of diethylenetriamine and one or more dicarboxylic acid derivative selected from DBE-2 dibasic ester, adipic acid, glutaric acid, dimethyl glutarate and dimethyl adipate or a mixture thereof.

9. The composition of claim 8 wherein the polyaminoamide is prepared by reacting the dicarboxylic acid derivatives with the polyalkylene polyamines in a mole ratio of about 0.9:1 to about 1:0.9 and the polyamide is prepared by reacting the dicarboxylic acid derivatives with the polyalkylene polyamines in a mole ratio of about 0.9:1 to about 1:0.9.

10. The composition of claim 9 wherein the polyaminoamide epihalohydrin resins are prepared by reacting the polyaminoamide with about 0.1 to about 0.3 molar equivalents of epichlorohydrin, based on secondary amino groups of the polyaminoamide.

11. The composition of claim 10 wherein the polyaminoamide epihalohydrin resins have a weight-average molecular weight of about 50,000 to about 2,000,000 Daltons and the polyamide has a weight-average molecular weight of about 1,000 to about 50,000 Daltons.

12. The composition of claim 11 comprising one or more polyaminoamide epihalohydrin resins and one or more polyamides in a ratio of about 10:90 to about 95:5 based on polymer actives.

13. The composition of claim 12 wherein the polyaminoamide epihalohydrin resins have a weight-average molecular weight of about 100,000 to about 1,000,000 Daltons and the polyamide has a weight-average molecular weight of about 3,000 to about 20,000 Daltons.

14. The composition of claim 13 wherein the polyaminoamide epihalohydrin resin is a terpolymer of glutaric, diethylenetriamine and epichlorohydrin and the polyamide is a copolymer of adipic acid and diethylenetriamine.

15. The composition of claim 14 wherein the polyaminoamide epihalohydrin resins have a weight-average molecular weight of about 100,000 to about 1,000,000 Daltons and the polyamide has a weight-average molecular weight of about 3,000 to about 20,000 Daltons.

16. The composition of claim 15 comprising one or more polyaminoamide epihalohydrin resins and one or more polyamides in a ratio of about 10:90 to about 95:5 based on polymer actives.

17. An aqueous creping adhesive composition comprising about 0.01 to about 50 percent by weight of the composition of claim 1 and about 99.99 to about 50 weight percent water.

18. The aqueous creping adhesive composition of claim 17 having a pH of about 2 to about 7.

19. The aqueous creping adhesive composition of claim 17 having a pH of about 4 to about 6.

20. The aqueous creping composition of claim 17 further comprising one item selected from the group consisting of at least one phosphate salt, at least one polyol, and any combination thereof.

21. The aqueous creping composition of claim 20 wherein the polyol is glycerol and the phosphate salt is selected from monoammonium phosphate, diammonium phosphate, phosphate salts formed in situ by adjusting the pH of the creping composition with phosphoric acid, and mixtures thereof.

22. A composition comprising a homogeneous mixture of one or more polyaminoamide epihalohydrin resins and one or more epihalohydrin-free polyamides formed by la chemical reaction which causes a condensation polymerization of one or more organic dicarboxylic acid derivatives and one or more polyalkene polyamines in a ratio of about 1:99 to about 99:1 based on polymer actives, the polyalkene polyamines having primary and secondary amino groups, wherein the composition comprises a sufficient amount of the organic dicarboxylic acid to react with substantially all of the primary amino groups but insufficient to react with substantially any of the secondary amino groups.

23. A composition comprising a homogeneous mixture of one or more polyaminoamide epihalohydrin resins and one or more epihalohydrin-free polyamides formed by a chemical reaction which causes a condensation polymerization of one or more organic dicarboxylic acid derivatives and one or more polyalkene polyamines in a ratio of about 1:99 to about 99:1 based on polymer actives, the one or more epihalohydrin-free polyamides having substantially no tertiary amino groups.

* * * * *